(12) United States Patent
Matsuhisa et al.

(10) Patent No.: US 8,298,704 B2
(45) Date of Patent: Oct. 30, 2012

(54) BATTERY GASKET AND ALKALINE BATTERY USING THE SAME

(75) Inventors: Ichiro Matsuhisa, Hyogo (JP); Susumu Kato, Osaka (JP)

(73) Assignee: Panasonic Corporation, Osaka (JP)

( * ) Notice: Subject to any disclaimer, the term of this patent is extended or adjusted under 35 U.S.C. 154(b) by 656 days.

(21) Appl. No.: 12/536,026

(22) Filed: Aug. 5, 2009

(65) Prior Publication Data

US 2010/0248019 A1  Sep. 30, 2010

(30) Foreign Application Priority Data

Mar. 27, 2009  (JP) ................. 2009-079735

(51) Int. Cl.
  *H01M 2/08*  (2006.01)
(52) U.S. Cl. ...................................... 429/185
(58) Field of Classification Search .............. 429/185
  See application file for complete search history.

(56) References Cited

U.S. PATENT DOCUMENTS

| | | | | |
|---|---|---|---|---|
| 5,672,443 A | * | 9/1997 | Salisbury et al. | 429/185 |
| 6,206,938 B1 | * | 3/2001 | Tucholski | 29/623.2 |
| 6,472,089 B1 | * | 10/2002 | Stricker et al. | 429/1 |
| 6,634,649 B1 | * | 10/2003 | Yamaguchi et al. | 277/634 |
| 2006/0083985 A1 | * | 4/2006 | Dunham | 429/185 |

FOREIGN PATENT DOCUMENTS

| | | |
|---|---|---|
| JP | 08-167405 | 6/1996 |
| JP | 2004-134168 | 4/2004 |
| JP | 2005-093204 | 4/2005 |

* cited by examiner

*Primary Examiner* — Tracy Dove
(74) *Attorney, Agent, or Firm* — McDermott Will & Emery LLP

(57) ABSTRACT

A gasket is made of an injection molded resin integral with a cylindrical boss portion having a through hole in which a current collector is inserted, a rim portion for sealing an opening of a battery case, and a connecting portion for connecting the boss portion and the rim portion, wherein the boss portion has an annular injection portion at an end face thereof, which is a trace of an injection molding gate, a ratio ($S_1/S_2$) between an axial cross-sectional area ($S_1$) of the boss portion and an axial cross-sectional area ($S_2$) of the injection portion is in the range of 10 to 25, and an outer diameter of the boss portion is in the range of 3.0 to 4.2 mm.

8 Claims, 6 Drawing Sheets

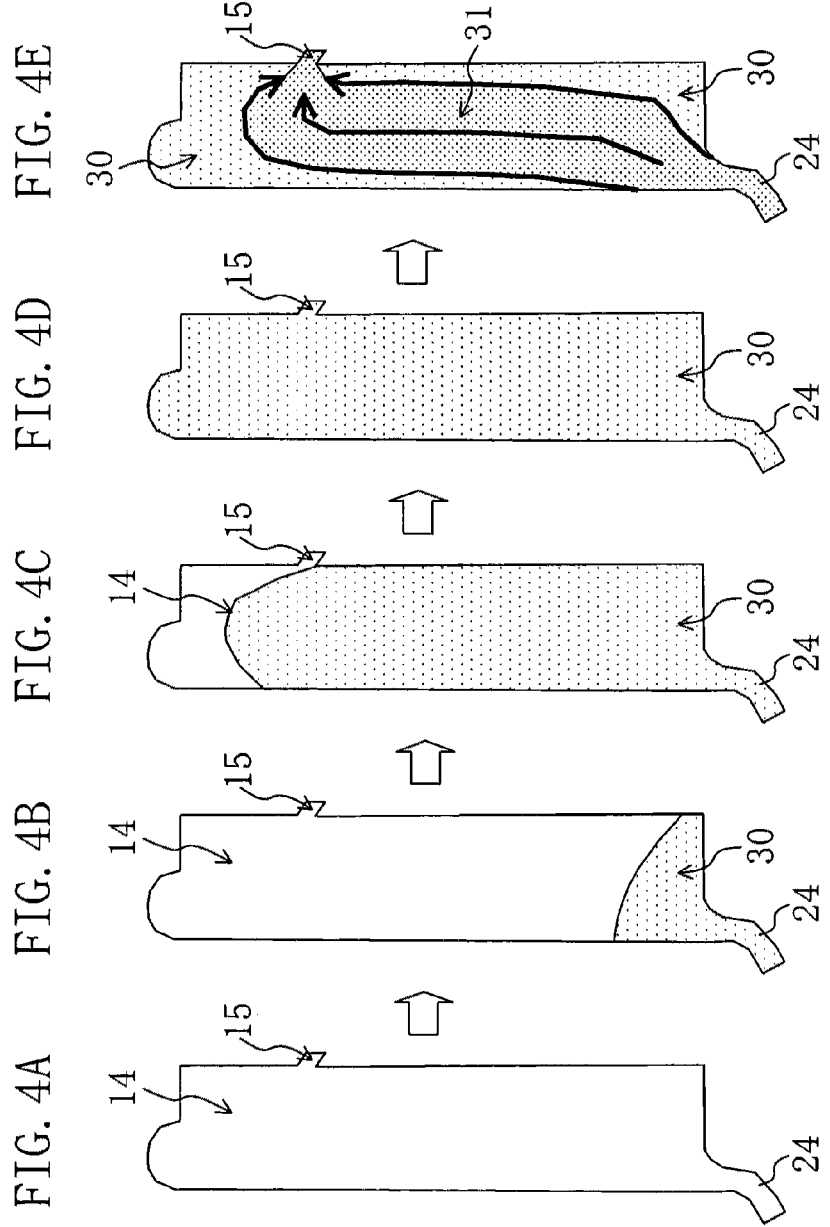

FIG. 5A
FIG. 5B
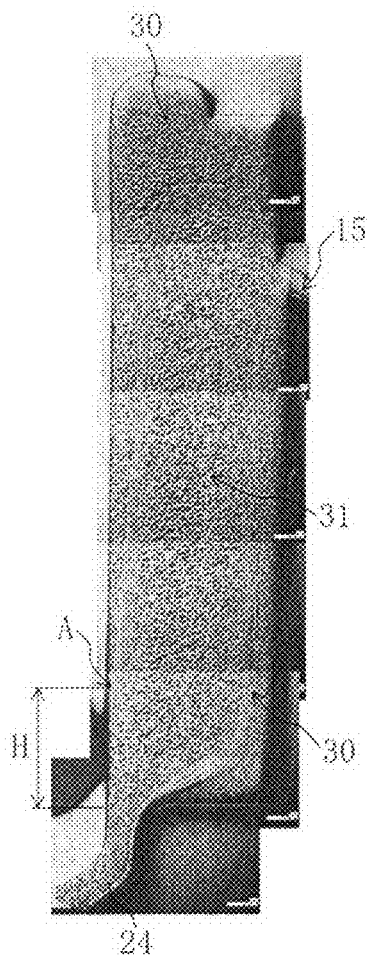
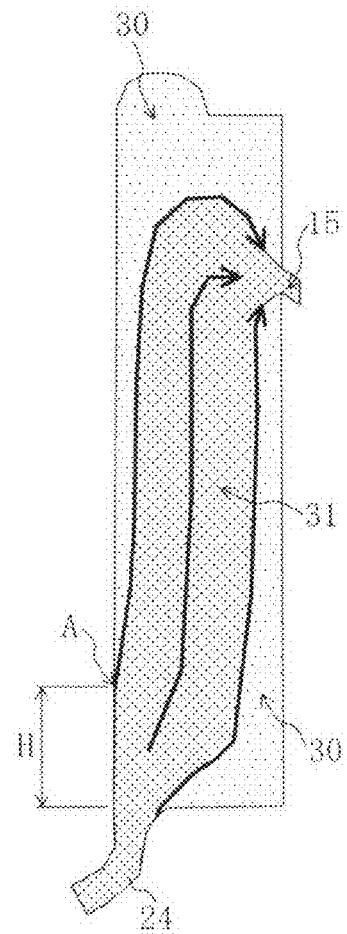

BATTERY GASKET AND ALKALINE BATTERY USING THE SAME

CROSS-REFERENCE TO RELATED APPLICATION

This application claims priority to Japanese Patent Application No. 2009-079735 filed on Mar. 27, 2009, the disclosure of which including the specification, the drawings, and the claims is hereby incorporated by reference in its entirety.

BACKGROUND

The present disclosure relates generally to a battery gasket for sealing an opening of a battery case, and an alkaline battery using the same.

A cylindrical alkaline battery is configured by placing battery components in a battery case, and sealing an opening of the battery case with a gasket.

In general, a gasket includes a cylindrical boss portion having a through hole in which a current collector is inserted, a rim portion for sealing an opening of a battery case, and a connecting portion for connecting the boss portion and the rim portion. The gasket thus configured is integrally injection molded by injecting a molten resin into an injection mold.

In injection molding the gasket, a gate through which the molten resin is injected in the injection mold may be arranged at various positions of the injection mold. For example, when the gasket includes a thin portion formed in the connecting portion to function as a safety vent for preventing the explosion of the battery, the gate is preferably arranged in the injection mold to correspond to an end face of the boss portion of the gasket so that the molten resin can smoothly flow into the injection mold (see, e.g., Published Unexamined Japanese Patent Applications Nos. 2005-093204, 2004-134168, and H08-167405).

SUMMARY

In arranging the gate for injecting the molten resin to correspond to the end face of the boss portion of the gasket, it is reasonable to arrange the gate in the injection mold to correspond to an end face of the boss portion facing a gelled negative electrode for easy manufacture and maintenance of the injection mold.

However, when the gasket is injection molded, the boss portion near the gate may easily crack due to residual stress of the injection molding. If part of the boss portion facing the gelled negative electrode (facing the inside of the battery) cracks, the gasket is hydrolyzed by an alkaline electrolyte contained in the gelled negative electrode, and tends to degrade over time. As a result, the electrolyte may leak through the crack in the gasket during long-term storage of the battery.

In order to solve the foregoing problem, the present disclosure advantageously provides a leak-proof battery gasket capable of preventing leakage of the electrolyte during long-term storage of the battery.

This summary is provided to introduce a selection of concepts in a simplified form that are further described below in the Detailed Description. It is not intended to identify key features of the claimed subject matter, nor is it intended to be used as an aid in determining the scope of the claimed subject matter.

The invention disclosed and claimed herein, in one aspect thereof, provides a battery gasket in which the ratio ($S_1/S_2$) between an axial cross-sectional area ($S_1$) of a boss portion of the gasket and an axial cross-sectional area ($S_2$) of an annular injection portion, which is a trace of an injection molding gate arranged in an injection mold to correspond to an end face of the boss portion, is in the range of 10 to 25.

According to one example implementation of the invention, the battery gasket seals an opening of a battery case of a cylindrical alkaline battery. The battery gasket is made of: an injection-molded resin integral with a cylindrical boss portion having a through hole in which a current collector is inserted, a rim portion for sealing the opening of the battery case, and a connecting portion for connecting the boss portion and the rim portion, wherein the boss portion has an annular injection portion at an end face thereof, which is a trace of an injection molding gate, a ratio ($S_1/S_2$) between an axial cross-sectional area ($S_1$) of the boss portion and an axial cross-sectional area ($S_2$) of the injection portion is in the range of 10 to 25, and an outer diameter of the boss portion is in the range of 3.0 to 4.2 mm, preferably 3.0 to 3.4 mm.

The gasket thus configured can prevent cracking of the boss portion of the gasket near the gate, and can prevent leakage of an electrolyte from an alkaline battery using the gasket during long-term storage of the alkaline battery. This can provide the alkaline battery with good leakage resistance.

According to one example implementation of the invention, the resin forming the gasket contains 5 to 40 wt % of a recycled resin which has been removed from the injection-molded resin. Further, 5 to 15 wt % of an inorganic filler is added to the resin forming the gasket, and the inorganic filler is preferably talc or kaoline.

According to one example implementation of the invention, the gasket is formed by injecting a resin into an injection mold through a gate arranged in the injection mold to correspond to an inner perimeter of the end face of the boss portion.

The invention disclosed and claimed herein, in one aspect thereof, provides an alkaline battery, an opening of a battery case of which is sealed with the above-described battery gasket, wherein the injection portion at the end face of the boss portion of the gasket faces a battery component contained in the battery case.

The disclosed gasket can prevent cracking of the boss portion of the gasket near the gate. This structure can prevent leakage of an electrolyte from an alkaline battery using the gasket during long-term storage of the alkaline battery, and can provide the alkaline battery with good leakage resistance.

BRIEF DESCRIPTION OF THE DRAWINGS

FIGS. 4A to 4E are cross-sectional views of a half of a cavity for forming a boss portion, illustrating how a molten resin flows until it fills the cavity.

FIG. 5A is a polarization microscopic photograph showing a section of a half of a boss portion of an injection molded gasket, and FIG. 5B is a schematic view of the photograph.

DETAILED DESCRIPTION

Hereinafter, an embodiment of the invention is described in detail with reference to the drawings. However, the invention is not limited to the following embodiment. The embodiment can be modified without deviating from the effective scope of the invention, and can be combined with other embodiments.

First Embodiment

Figure 1:
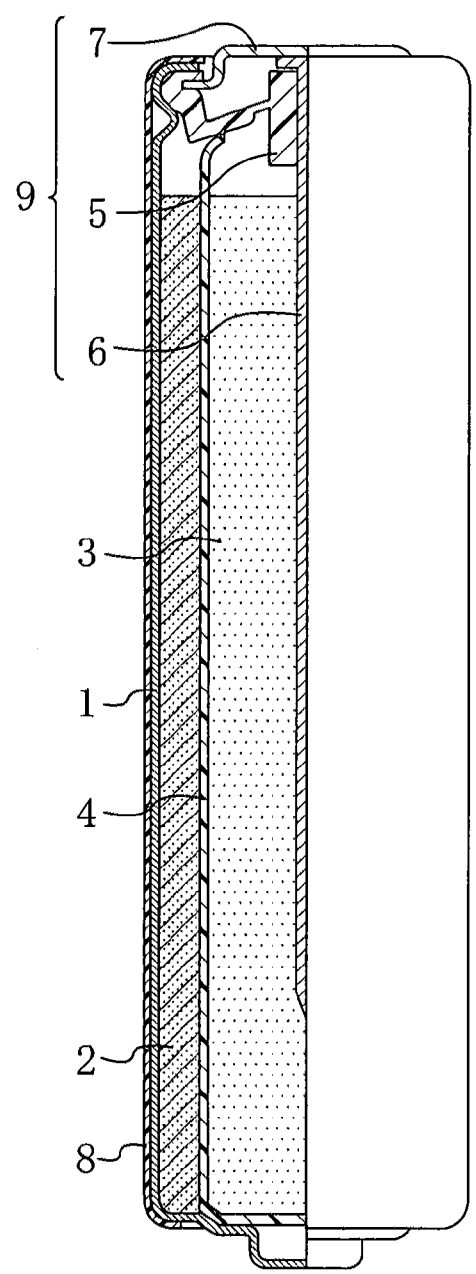
FIG. 1 is a view, half in cross-section, illustrating the structure of an alkaline battery of a first embodiment of the invention.

FIG. 1 is a view, half in cross-section, schematically illustrating the structure of a cylindrical alkaline battery in which a battery case is sealed with a gasket of the first embodiment of the invention.

As shown in FIG. 1, a closed-end, cylindrical battery case 1 contains a positive electrode 2 and a gelled negative electrode 3 with a separator 4 interposed therebetween, and an opening of the battery case 1 is sealed with a sealing unit 9 integral with a gasket 5, a negative electrode current collector 6, and a negative electrode terminal plate 7.

Figure 2:
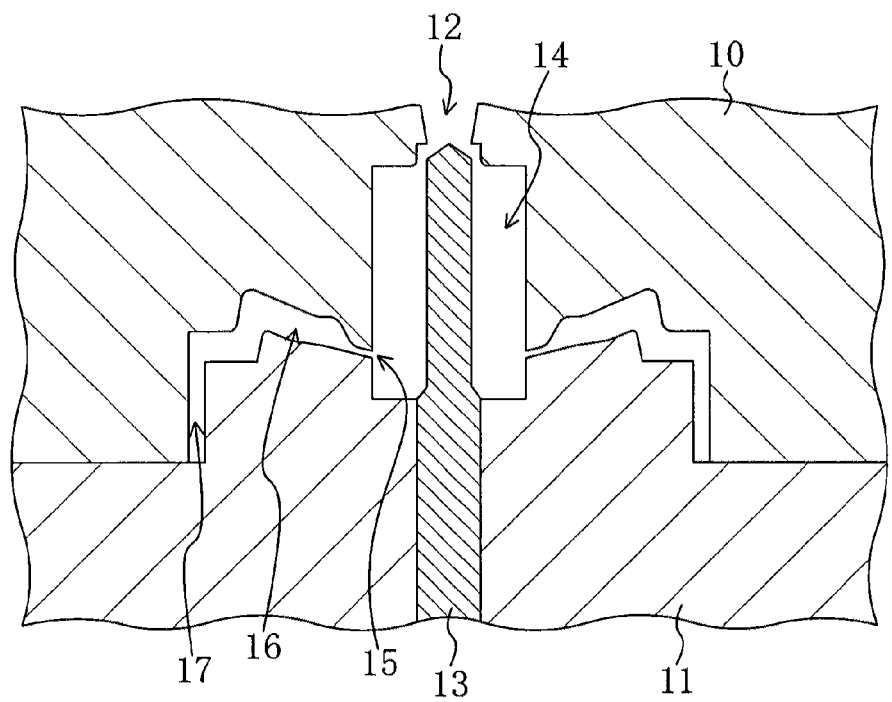
FIG. 2 is a cross-sectional view illustrating an injection mold for injection molding a gasket of the first embodiment.

FIG. 2 is a cross-sectional view illustrating an injection mold for injection molding the gasket 5. The injection mold is a combination of an upper mold 10 and a lower mold 11, and forms a cavity 14 for forming a boss portion, a cavity 16 for forming a connecting portion, and a cavity 17 for forming a rim portion. A core pin 13 for forming a through hole in which the current collector 6 is inserted is arranged in the cavity 14 for forming the boss portion. The upper injection mold 10 is provided with a gate 12 opened to face the tip of the core pin 13.

The gasket 5 is formed by injecting a molten resin into the cavities 14, 16 and 17 of the injection mold through the gate 12 arranged in the injection mold to correspond to an inner perimeter of an end face of the boss portion.

Figure 3:
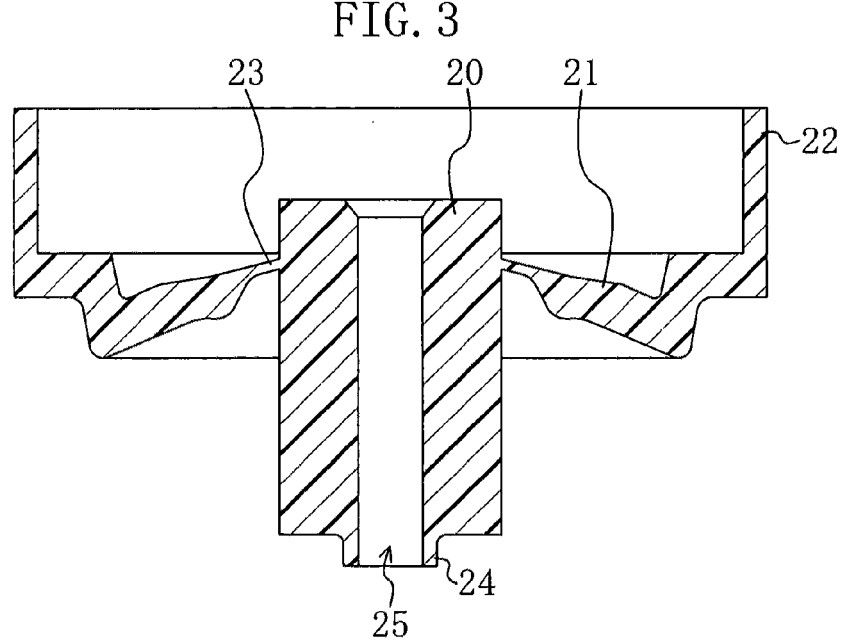
FIG. 3 is a cross-sectional view illustrating the structure of a gasket 5 of the first embodiment.

FIG. 3 is a cross-sectional view illustrating the structure of the gasket 5 which is injection molded in this manner. As shown in FIG. 3, the gasket 5 includes a cylindrical boss portion 20 having a through hole 25 in which the current collector 6 is inserted, a rim portion 22 for sealing the opening of the battery case, and a connecting portion 21 for connecting the boss portion 20 and the rim portion 22. The boss portion 20 has an annular injection portion 24 at an end thereof, which is a trace of the injection molding gate of the injection mold.

An effective means of increasing the capacity of the alkaline battery is to reduce the diameter of the current collector 6 to increase the amount of the negative electrode filled in the battery case 1. This is also effective for cost reduction.

The inventors of the present invention have discovered the following problem in the course of various studies on a battery including the current collector 6 of reduced diameter.

Reducing the diameter of the current collector 6 involves reducing the diameter of the core pin 13 in the injection mold shown in FIG. 2. For easy flow of the molten resin, the inventors thought that it would be more preferable to keep the diameter of the gate 12 unchanged to enlarge a gap between the gate 12 and the core pin 13, rather than to reduce the diameter of the gate 12 in accordance with the reduced diameter of the core pin 13. This is because the inventors appreciated that the larger gap would allow the molten resin to flow more smoothly into the injection mold.

Using the gasket 5 formed with the injection mold, alkaline batteries as shown in FIG. 1 were prepared, and their resis tance to leakage of an electrolyte was evaluated. Some of them experienced leakage of the electrolyte in a storage test at high temperature as described below.

The inventors of the present invention examined the cause of the electrolyte leakage, and found the following fact.

FIGS. 4A to 4E are cross-sectional views of a half of the cavity 14 for forming the boss portion 20 in the injection mold shown in FIG. 2, schematically illustrating how a molten resin 30 injected through the gate 12 flows until it fills the cavity 14.

The molten resin 30 injected through the gate 12 (the injection portion 24) fills the cavity 14 as shown in FIGS. 4A to 4D. Once the molten resin 30 fills the cavity 14, the molten resin 30 flows toward the connecting portion (not shown) through an opening 15 communicating with the connecting portion as shown in FIG. 4E. Specifically, the molten resin 30 injected through the gate 12 (the injection portion 24) passes a region 31 in the resin as indicated by arrows in FIG. 4E, and then flows into the connecting portion through the opening 15.

FIG. 5A is a polarization microscopic photograph showing a section of a half of the boss portion 20 of the injection molded gasket 5, and FIG. 5B is a schematic view of the photograph. FIGS. 5A and 5B indicate that a boundary is formed in the boss portion 20 between the resin region 31 which formed a certain flow from the injection portion 24 to the opening 15 and a resin region 30 which did not form the flow but stayed still. Hereinafter, part of the boundary in contact with an inner circumferential surface of the boss portion 20 is referred to as "an interface starting point A."

The gasket 5 shown in FIGS. 5A and 5B is generally used in a battery including a conventional large diameter current collector 6. The same observation was made on a gasket 5 used in a battery which includes the current collector 6 of reduced diameter and experienced the electrolyte leakage.

Figure 6A:
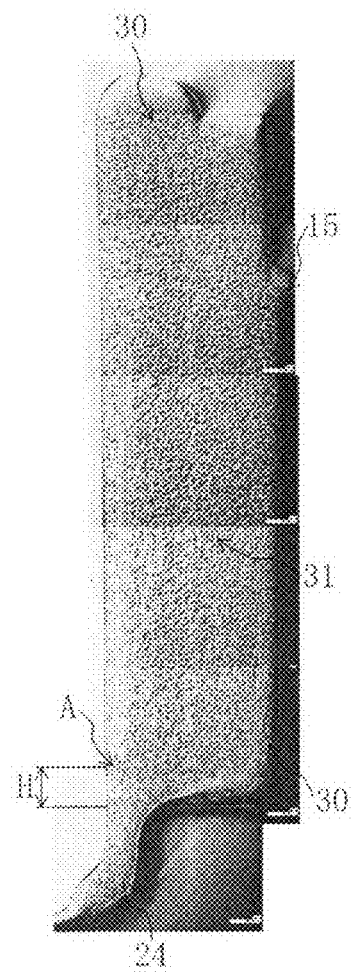
FIG. 6A is a polarization microscopic photograph showing a section of a half of a boss portion of a gasket that caused leakage of an electrolyte.
Figure 6B:
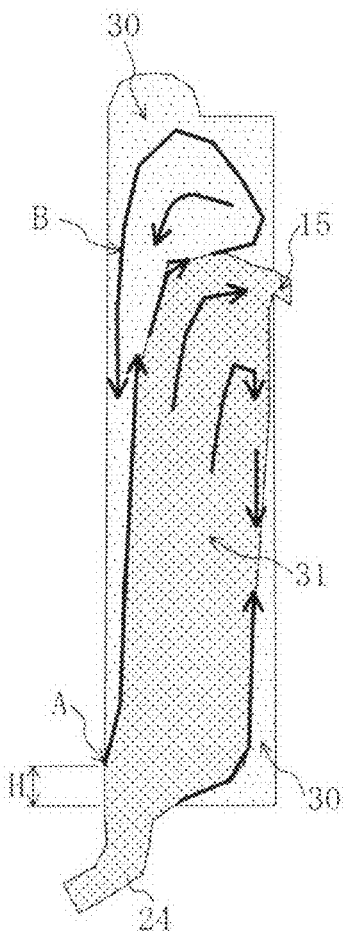
FIG. 6B is a schematic view of the photograph.

FIG. 6A is a polarization microscopic photograph showing a section of a half of the boss portion 20 of the gasket 5 used in the battery that experienced the electrolyte leakage, and FIG. 6B is a schematic view of the photograph. The interface starting point A shown in FIGS. 6A and 6B is closer to the injection portion 24 than the internal starting point A shown in FIGS. 5A and 5B. A possible cause of this is that part of the resin 31 forming a certain flow from the injection portion 24 to the opening 15 flows backward toward the injection portion 24. The backflow of the resin is presumably caused by increase of a flow of the molten resin injected into the cavity 14 through the gate 12 (the injection portion 24) due to the reduced diameter of the core pin 13 and the enlarged gap between the gate 12 and the core pin 13.

The inventors of the present invention made the following study to examine the relationship between a distance between the interface starting point A and the end face of the boss portion 20 having the injection portion 24 (hereinafter referred to as "a height of the interface starting point (H)") and the flow of the molten resin.

Figure 7:
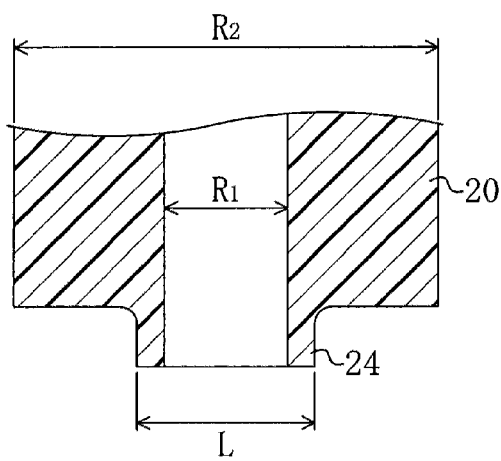
FIG. 7 is a partial cross-sectional view of a boss portion of a gasket.

Specifically, gaskets (examples 1 to 5) were formed with an inner diameter $R_1$ and an outer diameter $R_2$ of the boss portion 20 fixed to 1.1 mm and 3.0 mm, respectively, and an outer diameter L of the injection portion 24 varied in the range of 1.60 to 1.21 mm, as shown in FIG. 7. Then, the height of the interface starting point (H) in each of the gaskets was measured.

TABLE 1

|  | Ex. 1 | Ex. 2 | Ex. 3 | Ex. 4 | Ex. 5 |
|---|---|---|---|---|---|
| Outer diameter of injection portion [L] (mm) | 1.60 | 1.41 | 1.30 | 1.24 | 1.21 |
| Inner diameter of boss portion [$R_1$] (mm) |  |  | 1.10 |  |  |
| Outer diameter of boss portion [$R_2$] (mm) |  |  | 3.00 |  |  |
| Cross-sectional area of boss portion [$S_1$] (mm$^2$) |  |  | 6.12 |  |  |
| Cross-sectional area of injection portion [$S_2$] (mm$^2$) | 1.06 | 0.61 | 0.38 | 0.25 | 0.20 |
| $S_1/S_2$ | 5.77 | 10.01 | 16.23 | 24.71 | 30.66 |
| Height of interface starting point [H] (mm) | 0.22 | 0.51 | 0.73 | 0.83 | 0.88 |

Table 1 shows the measurement results. As shown in Table 1, the height of the interface starting point (H) decreases as the outer diameter L of the injection portion 24 increases. This indicates that the resin flows backward due to the increase in flow of the molten resin, and consequently, the interface starting point A approaches the end face of the boss portion 20.

Figure 8:
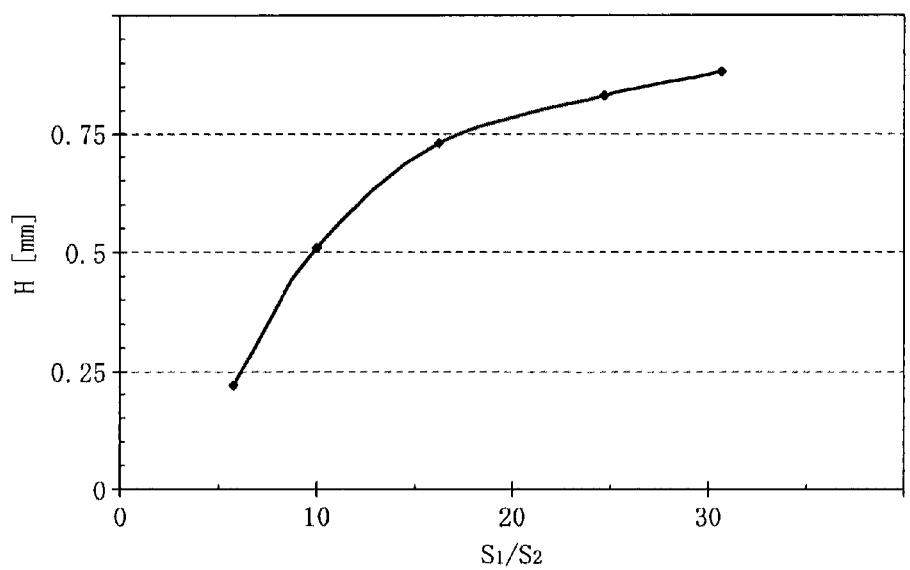
FIG. 8 is a graph illustrating the relationship between $S_1/S_2$ ratio and height H of an interface starting point.

FIG. 8 is a graph qualitatively illustrating the relationship, plotting the height of the interface starting point (H) with respect to the ratio ($S_1/S_2$) between an axial cross-sectional area ($S_1$) of the boss portion 20 and an axial cross-sectional area ($S_2$) of the injection portion 24.

Values $S_1$ and $S_2$ are calculated by the following equations.

$$S_1 = \pi/4(R_2^2 - R_1^2)$$

$$S_2 = \pi/4(L^2 - R_1^2)$$

The inventors of the present invention also examined the relationship between the $S_1/S_2$ value of the gasket and the leakage resistance of the alkaline battery using the gasket.

First, the gasket formed was visually checked. Specifically, the gaskets of examples 1 to 5, 50 pieces each, were prepared, and each of them was cut half in the direction of insertion of the current collector to microscopically inspect the outer surface of the boss portion 20 and the surface of the through hole 25, and the number of gaskets that produced a weld line was count. In addition, the surface of the rim portion 22 was also microscopically inspected, and the number of gaskets that produced a sink mark and a weld line was count.

Then, AA alkaline batteries were fabricated using the gaskets thus formed, and two leakage resistance tests, i.e., a high-temperature high-humidity test and a storage test, were performed. For the high-temperature high-humidity test, 20 batteries of each of the examples were stored in a test chamber at a temperature of 60° C. and a humidity of 90%, and the number of batteries that experienced the leakage was count every month (1 M). For the storage test, 110 batteries of each of the examples were stored in a test chamber at a temperature of 45° C., and the number of batteries that experienced the leakage was count after 3 months (3 M). Then, ten of the 110 batteries were disassembled, and the number of batteries in which a crack was found in the boss portion 20 near the gate 12 was count. The remaining 100 batteries were stored in the test chamber of 45° C. for 3 months, and the number of batteries that experienced the leakage was count after 6 months (6 M). Then, ten of the 100 batteries were disassembled, and the number of batteries in which a crack was found in the boss portion 20 near the gate 12 was count.

Table 2 shows the results of the above-described evaluation on the gaskets (example 1 to 5) having the $S_1/S_2$ value in the range of 5.77 to 30.66, and alkaline batteries using the gaskets.

TABLE 2

|  | Ex. 1 | Ex. 2 | Ex. 3 | Ex. 4 | Ex. 5 |
|---|---|---|---|---|---|
| $S_1/S_2$ | 5.77 | 10.01 | 16.23 | 24.71 | 30.66 |
| Weld line generated in boss portion | 5/50 | 0/50 | 0/50 | 0/50 | 0/50 |
| Sink mark generated in rim portion | 0/50 | 0/50 | 0/50 | 0/50 | 20/50 |
| Weld line generated in rim portion | 0/50 | 0/50 | 0/50 | 0/50 | 8/50 |
| Leakage (60° C., 90%, 1 M) | 0/20 | 0/20 | 0/20 | 0/20 | 0/20 |
| Leakage (60° C., 90%, 2 M) | 0/20 | 0/20 | 0/20 | 0/20 | 1/20 |
| Leakage (60° C., 90%, 3 M) | 0/20 | 0/20 | 0/20 | 0/20 | 3/20 |
| Leakage (45° C., 3 M) | 0/110 | 0/110 | 0/110 | 0/110 | 0/110 |
| Crack generated near gate (45° C., 3 M) | 7/10 | 0/10 | 0/10 | 0/10 | 0/10 |
| Leakage (45° C., 6 M) | 12/100 | 0/100 | 0/100 | 0/100 | 3/100 |
| Crack generated near gate (45° C., 6 M) | 10/10 | 0/10 | 0/10 | 0/10 | 10/10 |

As shown in Table 2, the weld line was found in the boss portion 20 by the visual check in some of the gaskets (example 1) having the $S_1/S_2$ value of 5.77. In the storage test at 45° C. for 3 months, the alkaline batteries using the gaskets of example 1 did not experience the electrolyte leakage. However, the crack was found in the gasket near the gate 12 in seven of the ten disassembled batteries. In the storage test at 45° C. for 6 months, the electrolyte leaked from some of the alkaline batteries, and the crack was found in the gasket near the gate 12 in every ten disassembled batteries.

The sink mark and the weld line were found in the rim portion 22 by the visual check in some of the gaskets (example 5) having the $S_1/S_2$ value of 30.66. In the high-temperature high-humidity test (60° C., 90%, 2 M, 3 M), some of the alkaline batteries using the gaskets of example 5 experienced the electrolyte leakage.

In contrast, both the weld line and the sink mark were not found in the boss portion 20 and the rim portion 22 by the visual check in the gaskets (examples 2 to 4) having the $S_1/S_2$ value of 10.01 to 24.71. In the high-temperature high-humidity test and the storage test for testing the leakage resistance, none of the alkaline batteries using the gaskets of examples 2 to 4 experienced the electrolyte leakage.

From the above-described results, the $S_1/S_2$ value smaller than 10 increases the flow of the injected molten resin, and the resin flows backward. This disturbs the flow of the resin near the inner circumferential surface of the boss portion 20, thereby bringing the interface starting point A close to the end face of the boss portion 20. This may lead to generation of the weld line, and easy cracking of the gasket near the end face of the boss portion 20. If the crack is generated near an end face of the boss portion 20 facing the gelled negative electrode, the electrolyte may leak through the crack in the boss portion 20.

When the $S_1/S_2$ value exceeds 25, the flow of the injected molten resin is reduced too much, and the resin takes long time to fill the cavity for forming the rim portion 22, which is an end portion of the gasket. Therefore, the sink mark and the weld line are likely to generate in the rim portion 22. As a result, in sealing the battery case by crimping the rim portion 22, adhesion between the rim portion 22 and the battery case may deteriorate, and the electrolyte may leak through a gap between the gasket and the battery case.

For these reasons, setting the $S_1/S_2$ ratio in the range of 10 to 25 is preferable for preventing the leakage of the electrolyte during long-term storage of the alkaline battery.

For verification of the preferable range, the gaskets (examples 1 to 5) shown in Table 1 were replaced with gaskets (examples 6 to 10) in which the inner diameter $R_1$ of the boss portion 20 was unchanged, and the outer diameter $R_2$ increased from 3.0 mm to 4.2 mm, and the same evaluation as shown in Table 2 was performed. To keep the $S_1/S_2$ value in the range of 8.09 to 29.4, the outer diameter L of the injection portion 24 was varied.

Table 3 shows the evaluation results. As shown in Table 3, the weld line was found in the boss portion 20 by the visual check in some of the gaskets (example 6) having the $S_1/S_2$ value of 8.09. In the storage test (45° C., 6 M) for testing the leakage resistance, some of the alkaline batteries using the gaskets of example 6 experienced the electrolyte leakage, and the crack was found in the gasket near the gate 12 in the batteries that experienced the leakage.

TABLE 3

|  | Ex. 6 | Ex. 7 | Ex. 8 | Ex. 9 | Ex. 10 |
|---|---|---|---|---|---|
| Outer diameter of injection portion [L] (mm) | 1.80 | 1.69 | 1.50 | 1.37 | 1.33 |
| Inner diameter of boss portion [$R_1$] (mm) |  |  | 1.10 |  |  |
| Outer diameter of boss portion [$R_2$] (mm) |  |  | 4.20 |  |  |
| Cross-sectional area of boss portion [$S_1$] (mm$^2$) |  |  | 12.90 |  |  |
| Cross-sectional area of injection portion [$S_2$] (mm$^2$) | 1.59 | 1.29 | 0.82 | 0.52 | 0.44 |
| $S_1/S_2$ | 8.09 | 9.98 | 15.80 | 24.64 | 29.40 |
| Weld line generated in boss portion | 6/50 | 0/50 | 0/50 | 0/50 | 0/50 |
| Sink mark generated in rim portion | 0/50 | 0/50 | 0/50 | 0/50 | 18/50 |
| Weld line generated in rim portion | 0/50 | 0/50 | 0/50 | 0/50 | 6/50 |
| Leakage (60° C., 90%, 1 M) | 0/20 | 0/20 | 0/20 | 0/20 | 0/20 |
| Leakage (60° C., 90%, 2 M) | 0/20 | 0/20 | 0/20 | 0/20 | 1/20 |
| Leakage (60° C., 90%, 3 M) | 0/20 | 0/20 | 0/20 | 0/20 | 4/20 |
| Leakage (45° C., 3 M) | 0/110 | 0/110 | 0/110 | 0/110 | 0/110 |
| Crack generated near gate (45° C., 3 M) | 6/10 | 0/10 | 0/10 | 0/10 | 0/10 |
| Leakage (45° C., 6 M) | 9/100 | 0/100 | 0/100 | 0/100 | 2/100 |
| Crack generated near gate (45° C., 6 M) | 10/10 | 3/10 | 2/10 | 2/10 | 10/10 |

The sink mark and the weld line were both found in the rim portion 22 by the visual check in some of the gaskets (example 10) having the $S_1/S_2$ value of 29.4. In the high-temperature high-humidity test (60° C., 90%, 2 M, 3 M) and the storage test (45° C., 6 M) for testing the leakage resistance, some of the alkaline batteries using the gaskets of example 10 experienced the electrolyte leakage.

In contrast, the weld line and the sink mark were not found in both of the boss portion 20 and the rim portion 22 by the visual check in the gaskets (examples 7 to 9) having the $S_1/S_2$ value of 9.98 to 24.64. In the high-temperature high-humidity test and the storage test for testing the leakage resistance, none of the alkaline batteries using the gaskets of examples 7 to 9 experienced the electrolyte leakage.

The above-described results verify that the $S_1/S_2$ value in the range of 10 to 25 is preferable for preventing the electrolyte leakage during long-term storage of the alkaline battery.

For checking the relationship between the outer diameter $R_2$ of the boss portion 20 and the leakage resistance of the battery, the following evaluation was performed. Specifically, two types of gaskets were prepared in which the outer diameters $R_2$ of the boss portions 20 was 2.8 mm and 4.5 mm, respectively, and they were evaluated in the same manner as indicated in Table 2.

As shown in Table 4, the weld line was found in the boss portion 20 by the visual check in some of the gaskets (examples 11 and 12), in each of which the outer diameter $R_2$ of the boss portion 20 was 2.8 mm. In the high-temperature high-humidity test (60° C., 90%, 2 M, 3 M) and the storage test (45° C., 6 M) for testing the leakage resistance, some of the alkaline batteries using the gaskets of examples 11 and 12 experienced the electrolyte leakage, and the crack was found in the gasket near the gate 12 in the batteries that experienced the leakage.

TABLE 4

|  | Ex. 11 | Ex. 12 | Ex. 13 | Ex. 14 |
|---|---|---|---|---|
| Outer diameter of injection portion [L] (mm) | 1.33 | 1.23 | 1.75 | 1.41 |
| Inner diameter of boss portion [$R_1$] (mm) |  | 1.10 |  |  |
| Outer diameter of boss portion [$R_2$] (mm) | 2.80 |  | 4.50 |  |
| Cross-sectional area of boss portion [$S_1$] (mm$^2$) | 5.21 |  | 14.95 |  |
| Cross-sectional area of injection portion [$S_2$] (mm$^2$) | 0.44 | 0.24 | 1.45 | 0.61 |
| $S_1/S_2$ | 11.86 | 21.89 | 10.28 | 24.47 |
| Weld line generated in boss portion | 3/50 | 5/50 | 2/50 | 0/50 |
| Sink mark generated in rim portion | 0/50 | 0/50 | 0/50 | 10/50 |
| Weld line generated in rim portion | 0/50 | 0/50 | 0/50 | 3/50 |
| Leakage (60° C., 90%, 1 M) | 0/20 | 0/20 | 0/20 | 0/20 |
| Leakage (60° C., 90%, 2 M) | 1/20 | 0/20 | 0/20 | 2/20 |
| Leakage (60° C., 90%, 3 M) | 4/20 | 0/20 | 3/20 | 6/20 |
| Leakage (45° C., 3 M) | 0/110 | 0/110 | 0/110 | 0/110 |
| Crack generated near gate (45° C., 3 M) | 4/10 | 6/10 | 3/10 | 0/10 |
| Leakage (45° C., 6 M) | 5/100 | 7/100 | 4/100 | 2/100 |
| Crack generated near gate (45° C., 6 M) | 10/10 | 10/10 | 10/10 | 10/10 |

The sink mark and the weld line were both found in the rim portion 22 by the visual check in some of the gaskets (examples 13 and 14), in each of which the outer diameter $R_2$ of the boss portion 20 was 4.5 mm. In the high-temperature high-humidity test (60° C., 90%, 2 M, 3 M) and the storage test (45° C., 6 M) for testing the leakage resistance, some of the alkaline batteries using the gaskets of examples 13 and 14 experienced the electrolyte leakage.

The above-described results indicate that the outer diameter $R_2$ of the boss portion 20 smaller than 3.0 mm reduces the thickness of the boss portion relative to the flow of the molten resin. Therefore, the resin flows backward, and the weld line is likely to generate in the boss portion 20, even when the $S_1/S_2$ value is in the range of 10 to 25. On the other hand, the outer diameter $R_2$ of the boss portion 20 larger than 4.2 mm increases the thickness of the boss portion relative to the flow of the molten resin, and the resin takes long time to fill the cavity for forming the rim portion 22, which is an end portion of the gasket. Therefore, the sink mark and the weld line are likely to generate in the rim portion 22. As a result, the boss portion 20 may crack, and the adhesion between the rim portion 22 and the battery case may deteriorate, resulting in the leakage of the electrolyte.

The foregoing studies indicate that it is preferable for prevention of the electrolyte leakage during the long-term storage of the alkaline battery to set the ratio ($S_1/S_2$) between the axial cross-sectional area ($S_1$) of the boss portion and the axial cross-sectional area ($S_2$) of the injection portion 24 in the range of 10 to 25, and to set the outer diameter $R_2$ of the boss portion 20 in the range of 3.0 to 4.2 mm.

The ratio and the outer diameter thus controlled make it possible to prevent cracking of the boss portion 20 of the gasket 5 near the gate 12, and to allow the alkaline battery using the gasket 5 to exhibit good leakage resistance during the long-term storage.

As shown in Table 3, the alkaline batteries of examples 7 to 9, in which the boss portion 20 had a 4.2 mm outer diameter $R_2$, did not experience the electrolyte leakage in the storage test (45° C., 6 M) for testing the leakage resistance. However, the crack was found in the gasket near the gate in some of the alkaline batteries. Therefore, for prolonged storage, giving higher leakage resistance to the batteries is preferable.

Looking for batteries free from the electrolyte leakage during prolonged storage, alkaline batteries using gaskets (examples 15 to 17) were prepared, in each of which the boss portion 20 had a 3.4 mm outer diameter $R_2$, and they were evaluated in the same manner as indicated in Table 2. The outer diameter L of the injection portion 24 was varied to keep the $S_1/S_2$ value in the range of 8.95 to 24.16.

Table 5 shows the evaluation results. In the storage test (45° C., 6 M) for testing the leakage resistance, the crack was not found in the gasket near the gate 12 in every alkaline battery (examples 15 to 17) as shown in Table 5.

TABLE 5

|  | Ex. 15 | Ex. 16 | Ex. 17 |
|---|---|---|---|
| Outer diameter of injection portion [L] (mm) | 1.50 | 1.35 | 1.28 |
| Inner diameter of boss portion [$R_1$] (mm) | | 1.10 | |
| Outer diameter of boss portion [$R_2$] (mm) | | 3.40 | |
| Cross-sectional area of boss portion [$S_1$] (mm²) | | 8.13 | |
| Cross-sectional area of injection portion [$S_2$] (mm²) | 0.82 | 0.48 | 0.34 |
| $S_1/S_2$ | 9.95 | 16.90 | 24.16 |
| Weld line generated in boss portion | 0/50 | 0/50 | 0/50 |
| Sink mark generated in rim portion | 0/50 | 0/50 | 0/50 |
| Weld line generated in rim portion | 0/50 | 0/50 | 0/50 |
| Leakage (60° C., 90%, 1 M) | 0/20 | 0/20 | 0/20 |
| Leakage (60° C., 90%, 2 M) | 0/20 | 0/20 | 0/20 |
| Leakage (60° C., 90%, 3 M) | 0/20 | 0/20 | 0/20 |
| Leakage (45° C., 3 M) | 0/110 | 0/110 | 0/110 |
| Crack generated near gate (45° C., 3 M) | 0/10 | 0/10 | 0/10 |
| Leakage (45° C., 6 M) | 0/100 | 0/100 | 0/100 |
| Crack generated near gate (45° C., 6 M) | 0/10 | 0/10 | 0/10 |

For preventing the electrolyte leakage from the alkaline battery during the prolonged storage, the ratio ($S_1/S_2$) between the axial cross-sectional area ($S_1$) of the boss portion 20 and the axial cross-sectional area ($S_2$) of the injection portion 24 is preferably set in the range of 10 to 25, and the outer diameter $R_2$ of the boss portion 20 is preferably set in the range of 3.0 to 3.4 mm.

Next, the evaluation performed on the AA alkaline batteries was performed on AAA alkaline batteries using the gaskets indicated in Tables 1 to 5.

TABLE 6

|  | Ex. 18 | Ex. 19 | Ex. 20 | Ex. 21 | Ex. 22 |
|---|---|---|---|---|---|
| Outer diameter of injection portion [L] (mm) | 1.60 | 1.41 | 1.30 | 1.24 | 1.21 |
| Inner diameter of boss portion [$R_1$] (mm) | | | 1.10 | | |
| Outer diameter of boss portion [$R_2$] (mm) | | | 3.00 | | |
| Cross-sectional area of boss portion [$S_1$] (mm²) | | | 6.12 | | |
| Cross-sectional area of injection portion [$S_2$] (mm²) | 1.06 | 0.61 | 0.38 | 0.25 | 0.20 |
| $S_1/S_2$ | 5.77 | 10.01 | 16.23 | 24.71 | 30.66 |
| Weld line generated in boss portion | 22/50 | 0/50 | 0/50 | 0/50 | 0/50 |
| Sink mark generated in rim portion | 0/50 | 0/50 | 0/50 | 0/50 | 25/50 |
| Weld line generated in rim portion | 0/50 | 0/50 | 0/50 | 0/50 | 6/50 |
| Leakage (60° C., 90%, 1 M) | 0/20 | 0/20 | 0/20 | 0/20 | 0/20 |
| Leakage (60° C., 90%, 2 M) | 0/20 | 0/20 | 0/20 | 0/20 | 2/20 |
| Leakage (60° C., 90%, 3 M) | 0/20 | 0/20 | 0/20 | 0/20 | 4/20 |
| Leakage (45° C., 3 M) | 0/110 | 0/110 | 0/110 | 0/110 | 0/110 |
| Crack generated near gate (45° C., 3 M) | 8/10 | 0/10 | 0/10 | 0/10 | 0/10 |
| Leakage (45° C., 6 M) | 13/100 | 0/100 | 0/100 | 0/100 | 4/100 |
| Crack generated near gate (45° C., 6 M) | 10/10 | 0/10 | 0/10 | 0/10 | 10/10 |

Table 6 shows the results of the evaluation on the alkaline batteries in which the boss portion 20 had a 3.0 mm outer diameter $R_2$. As shown in Table 6, the AAA alkaline batteries showed almost the same results as those of the AA alkaline batteries (see Tables 1 and 2).

TABLE 7

|  | Ex. 23 | Ex. 24 | Ex. 25 | Ex. 26 | Ex. 27 |
|---|---|---|---|---|---|
| Outer diameter of injection portion [L] (mm) | 1.80 | 1.69 | 1.50 | 1.37 | 1.33 |
| Inner diameter of boss portion [$R_1$] (mm) | | | 1.10 | | |
| Outer diameter of boss portion [$R_2$] (mm) | | | 4.20 | | |
| Cross-sectional area of boss portion [$S_1$] (mm²) | | | 12.90 | | |
| Cross-sectional area of injection portion [$S_2$] (mm²) | 1.59 | 1.29 | 0.82 | 0.52 | 0.44 |
| $S_1/S_2$ | 8.09 | 9.98 | 15.80 | 24.64 | 29.40 |
| Weld line generated in boss portion | 18/50 | 0/50 | 0/50 | 0/50 | 0/50 |
| Sink mark generated in rim portion | 0/50 | 0/50 | 0/50 | 0/50 | 23/50 |
| Weld line generated in rim portion | 0/50 | 0/50 | 0/50 | 0/50 | 7/50 |
| Leakage (60° C., 90%, 1 M) | 0/20 | 0/20 | 0/20 | 0/20 | 0/20 |
| Leakage (60° C., 90%, 2 M) | 5/20 | 0/20 | 0/20 | 0/20 | 2/20 |
| Leakage (60° C., 90%, 3 M) | 12/20 | 0/20 | 0/20 | 0/20 | 8/20 |
| Leakage (45° C., 3 M) | 0/110 | 0/110 | 0/110 | 0/110 | 0/110 |
| Crack generated near gate (45° C., 3 M) | 7/10 | 0/10 | 0/10 | 0/10 | 0/10 |
| Leakage (45° C., 6 M) | 12/100 | 0/100 | 0/100 | 0/100 | 4/100 |
| Crack generated near gate (45° C., 6 M) | 10/10 | 3/10 | 2/10 | 2/10 | 10/10 |

Table 7 shows the results of the evaluation on the alkaline batteries in which the boss portion 20 had a 4.2 mm outer diameter $R_2$. As shown in Table 7, the AAA alkaline batteries showed almost the same results as those of the AA alkaline batteries (see Table 3).

TABLE 8

|  | Ex. 28 | Ex. 29 | Ex. 30 | Ex. 31 |
|---|---|---|---|---|
| Outer diameter of injection portion [L] (mm) | 1.33 | 1.23 | 1.75 | 1.41 |
| Inner diameter of boss portion [$R_1$] (mm) | | 1.10 | | |
| Outer diameter of boss portion [$R_2$] (mm) | 2.80 | | 4.50 | |
| Cross-sectional area of boss portion [$S_1$] (mm²) | 5.21 | | 14.95 | |

TABLE 8-continued

|  | Ex. 28 | Ex. 29 | Ex. 30 | Ex. 31 |
| --- | --- | --- | --- | --- |
| Cross-sectional area of injection portion [$S_2$] (mm$^2$) | 0.44 | 0.24 | 1.45 | 0.61 |
| $S_1/S_2$ | 11.86 | 21.89 | 10.28 | 24.47 |
| Weld line generated in boss portion | 9/50 | 11/50 | 5/50 | 0/50 |
| Sink mark generated in rim portion | 0/50 | 0/50 | 0/50 | 18/50 |
| Weld line generated in rim portion | 0/50 | 0/50 | 0/50 | 8/50 |
| Leakage (60° C., 90%, 1 M) | 0/20 | 0/20 | 0/20 | 0/20 |
| Leakage (60° C., 90%, 2 M) | 1/20 | 0/20 | 1/20 | 3/20 |
| Leakage (60° C., 90%, 3 M) | 4/20 | 0/20 | 4/20 | 8/20 |
| Leakage (45° C., 3 M) | 0/110 | 0/110 | 0/110 | 0/110 |
| Crack generated near gate (45° C., 3 M) | 5/10 | 8/10 | 5/10 | 0/10 |
| Leakage (45° C., 6 M) | 12/100 | 12/100 | 10/100 | 2/100 |
| Crack generated near gate (45° C., 6 M) | 10/10 | 10/10 | 10/10 | 10/10 |

Table 8 shows the results of the evaluation on the alkaline batteries in which the outer diameter $R_2$ of the boss portion 20 was 2.8 mm and 4.5 mm. As shown in Table 8, the AAA alkaline batteries showed almost the same results as those of the AA alkaline batteries (see Table 4).

TABLE 9

|  | Ex. 32 | Ex. 33 | Ex. 34 |
| --- | --- | --- | --- |
| Outer diameter of injection portion [L] (mm) | 1.50 | 1.53 | 1.28 |
| Inner diameter of boss portion [$R_1$] (mm) |  | 1.10 |  |
| Outer diameter of boss portion [$R_2$] (mm) |  | 3.40 |  |
| Cross-sectional area of boss portion [$S_1$] (mm$^2$) |  | 8.13 |  |
| Cross-sectional area of injection portion [$S_2$] (mm$^2$) | 0.82 | 0.48 | 0.34 |
| $S_1/S_2$ | 9.95 | 16.90 | 24.16 |
| Weld line generated in boss portion | 0/50 | 0/50 | 0/50 |
| Sink mark generated in rim portion | 0/50 | 0/50 | 0/50 |
| Weld line generated in rim portion | 0/50 | 0/50 | 0/50 |
| Leakage (60° C., 90%, 1 M) | 0/20 | 0/20 | 0/20 |
| Leakage (60° C., 90%, 2 M) | 0/20 | 0/20 | 0/20 |
| Leakage (60° C., 90%, 3 M) | 0/20 | 0/20 | 0/20 |
| Leakage (45° C., 3 M) | 0/110 | 0/110 | 0/110 |
| Crack generated near gate (45° C., 3 M) | 0/10 | 0/10 | 0/10 |
| Leakage (45° C., 6 M) | 0/100 | 0/100 | 0/100 |
| Crack generated near gate (45° C., 6 M) | 0/10 | 0/10 | 0/10 |

Table 9 shows the results of the evaluation on the alkaline batteries in which the boss portion 20 had a 3.4 mm outer diameter $R_2$. As shown in Table 9, the AAA alkaline batteries showed almost the same results as those of the AA alkaline batteries (see Table 5).

As indicated above, the AAA alkaline batteries showed almost the same results as those of the AA alkaline batteries. Specifically, for preventing the electrolyte leakage from the AAA alkaline battery during the prolonged storage, the ratio ($S_1/S_2$) between the axial cross-sectional area ($S_1$) of the boss portion 20 and the axial cross-sectional area ($S_2$) of the injection portion 24 is preferably set in the range of 10 to 25, and the outer diameter $R_2$ of the boss portion 20 is preferably set in the range of 3.0 to 4.2 mm, more preferably 3.0 to 3.4 mm.

The advantages of the present invention will more remarkably be exhibited when the injection portion 24 at the end face of the boss portion 20 of the gasket 5 faces the battery components contained in the battery case.

The term "injection portion" used in the present specification indicates a trace of the injection molding gate of the injection mold left on the end face of the boss portion 20 of the injection molded gasket. The injection portion is not always limited to the cylindrical one as shown in FIG. 3 or FIG. 7, as long as it is an annular portion having a certain cross-sectional area.

The material for the gasket 5 disclosed herein is not particularly limited, but for example, alkali- and heat-resistant 6,6-nylon, 6,10-nylon, 6,12-nylon, etc. may suitably be used.

Other Embodiments

<Gasket Containing Recycled Resin>

In general, a single injection mold can form multiple gaskets at a time. In this case, runner portions formed between the multiple gaskets are removed from the injection molded gaskets, and are mixed and reused together with a virgin material. However, due to different thermal history, the reused resin (recycled resin) does not stably flow when it is molten and injected into the injection mold, thereby inducing generation of the weld line.

To check the influence of the rate of the recycled resin (recycling rate) on the leakage resistance of the battery, the following evaluation was performed. Specifically, three types of gaskets having different recycling rates of 5, 20, and 40 wt % were prepared, and they were evaluated in the same manner as indicated in Table 2.

Table 10 shows the evaluation results. The dimensions of the respective portions of the gaskets were the same as those indicated in Table 10. The outer diameter $R_2$ of the boss portion 20 was set to 4.0 mm, and the $S_1/S_2$ value was set to 16.57 and 7.29.

TABLE 10

|  | Ex. 35 | Ex. 36 | Ex. 37 | Ex. 38 | Ex. 39 | Ex. 40 |
| --- | --- | --- | --- | --- | --- | --- |
| Recycling rate (%) | 5 | 20 | 40 | 5 | 20 | 40 |
| Outer diameter of injection portion [L] (mm) |  | 1.45 |  |  | 1.80 |  |
| Inner diameter of boss portion [$R_1$] (mm) |  |  | 1.10 |  |  |  |
| Outer diameter of boss portion [$R_2$] (mm) |  |  | 4.00 |  |  |  |
| Cross-sectional area of boss portion [$S_1$] (mm$^2$) |  |  | 11.62 |  |  |  |
| Cross-sectional area of injection portion [$S_2$] (mm$^2$) |  | 0.70 |  |  | 1.59 |  |
| $S_1/S_2$ |  | 16.57 |  |  | 7.29 |  |
| Weld line generated in boss portion | 0/50 | 0/50 | 0/50 | 20/50 | 26/50 | 30/50 |
| Sink mark generated in rim portion | 0/50 | 0/50 | 0/50 | 0/50 | 0/50 | 0/50 |
| Weld line generated in rim portion | 0/50 | 0/50 | 0/50 | 0/50 | 0/50 | 0/50 |
| Leakage (60° C., 90%, 1 M) | 0/20 | 0/20 | 0/20 | 0/20 | 0/20 | 0/20 |

TABLE 10-continued

|  | Ex. 35 | Ex. 36 | Ex. 37 | Ex. 38 | Ex. 39 | Ex. 40 |
|---|---|---|---|---|---|---|
| Leakage (60° C., 90%, 2 M) | 0/20 | 0/20 | 0/20 | 0/20 | 0/20 | 0/20 |
| Leakage (60° C., 90%, 3 M) | 0/20 | 0/20 | 0/20 | 0/20 | 0/20 | 0/20 |
| Leakage (45° C., 3 M) | 0/110 | 0/110 | 0/110 | 0/110 | 0/110 | 0/110 |
| Crack generated near gate (45° C., 3 M) | 0/10 | 0/10 | 0/10 | 7/10 | 8/10 | 10/10 |
| Leakage (45° C., 6 M) | 0/100 | 0/100 | 0/100 | 16/100 | 21/100 | 38/100 |
| Crack generated near gate (45° C., 6 M) | 3/10 | 5/10 | 6/10 | 10/10 | 10/10 | 10/10 |

As shown in Table 10, the weld line and the sink mark were not found in both of the boss portion 20 and the rim portion 22 by the visual check in the gaskets (examples 35 and 36) having the $S_1/S_2$ value of 16.57, and the recycling rate of 5, 20, and 40 wt %. In the high-temperature high-humidity test and the storage test for testing the leakage resistance, none of the alkaline batteries using the gaskets of examples 35 and 36 experienced the electrolyte leakage.

On the other hand, the weld line was found in the boss portion 20 by the visual check in some of the gaskets (examples 38 to 40) having the $S_1/S_2$ value of 7.29, and the recycling rate of 5, 20, and 40 wt %. In the storage test (45° C., 6 M) for testing the leakage resistance, some of the alkaline batteries using the gaskets of examples 38 to 40 experienced the electrolyte leakage, and the crack was found in the gasket near the gate 12 in the batteries that experienced the leakage.

The above-described results indicate that setting the $S_1/S_2$ value in the range of 10 to 25 makes it possible to prevent electrolyte leakage from the alkaline battery using the gasket containing 5 to 40 wt % of the recycled resin during the prolonged storage.

<Gasket Added with Inorganic Filler>

An inorganic filler may generally be added to the resin to increase rigidity and heat resistance of the gasket. However, the resin added with the inorganic filler does not stably flow when it is molten and injected into the injection mold, thereby inducing generation of the weld line.

To check the influence of the amount of the added inorganic filler on the leakage resistance of the battery, the following evaluation was performed. Specifically, talc was used as the inorganic filler, and three types of gaskets added with 5, 10 and 15 wt % of talc, respectively, were prepared, and they were evaluated as indicated in Table 2.

Table 11 shows the evaluation results. The dimensions of the respective portions of the gaskets were the same as those indicated in Table 11. The outer diameter $R_2$ of the boss portion 20 was set to 4.0 mm, and the $S_1/S_2$ value was set to 16.57 and 7.29.

TABLE 11

|  | Ex. 41 | Ex. 42 | Ex. 43 | Ex. 44 | Ex. 45 | Ex. 46 |
|---|---|---|---|---|---|---|
| Amount of talc added (%) | 5 | 10 | 15 | 5 | 10 | 15 |
| Outer diameter of injection portion [L] (mm) |  | 1.45 |  |  | 1.80 |  |
| Inner diameter of boss portion [$R_1$] (mm) |  |  | 1.10 |  |  |  |
| Outer diameter of boss portion [$R_2$] (mm) |  |  | 4.00 |  |  |  |
| Cross-sectional area of boss portion [$S_1$] (mm$^2$) |  |  | 11.62 |  |  |  |
| Cross-sectional area of injection portion [$S_2$] (mm$^2$) |  | 0.70 |  |  | 1.59 |  |
| $S_1/S_2$ |  | 16.57 |  |  | 7.29 |  |
| Weld line generated in boss portion | 0/50 | 0/50 | 0/50 | 25/50 | 31/50 | 40/50 |
| Sink mark generated in rim portion | 0/50 | 0/50 | 0/50 | 0/50 | 0/50 | 0/50 |
| Weld line generated in rim portion | 0/50 | 0/50 | 0/50 | 0/50 | 0/50 | 0/50 |
| Leakage (60° C., 90%, 1 M) | 0/20 | 0/20 | 0/20 | 0/20 | 0/20 | 0/20 |
| Leakage (60° C., 90%, 2 M) | 0/20 | 0/20 | 0/20 | 0/20 | 0/20 | 0/20 |
| Leakage (60° C., 90%, 3 M) | 0/20 | 0/20 | 0/20 | 0/20 | 0/20 | 0/20 |
| Leakage (45° C., 3 M) | 0/110 | 0/110 | 0/110 | 0/110 | 5/110 | 10/110 |
| Crack generated near gate (45° C., 3 M) | 0/10 | 0/10 | 0/10 | 7/10 | 8/10 | 10/10 |
| Leakage (45° C., 6 M) | 0/100 | 0/100 | 0/100 | 26/100 | 32/100 | 40/100 |
| Crack generated near gate (45° C., 6 M) | 4/10 | 7/10 | 8/10 | 10/10 | 10/10 | 10/10 |

As shown in Table 11, the weld line and the sink mark were not found in both of the boss portion 20 and the rim portion 22 by the visual check in the gaskets (examples 41 to 43) having the $S_1/S_2$ value of 16.57, and being added with 5, 10, and 15 wt % of talc. In the high-temperature high-humidity test and the storage test for testing the leakage resistance, none of the alkaline batteries using the gaskets of the alkaline batteries of examples 41 to 43 experienced the electrolyte leakage.

On the other hand, the weld line was found in the boss portion 20 by the visual check in some of the gaskets (examples 44 to 46) having the $S_1/S_2$ value of 7.29, and being added with 5, 10, and 15 wt % of talc. In the storage test (45° C., 6 M), some of the alkaline batteries using the gaskets of examples 44 to 46 experienced the electrolyte leakage, and the crack was found in the gasket near the gate 12 in the batteries that experienced the electrolyte leakage.

The same evaluation was performed on the batteries added with kaoline as the inorganic filler.

Table 12 shows the evaluation results. As shown in Table 12, the weld line and the sink mark were not found in the boss portion 20 and the rim portion 22 by the visual check in the gaskets (examples 47 to 49) having the $S_1/S_2$ value of 16.57, and being added with 5, 10, and 15 wt % of kaoline. In the high-temperature high-humidity test and the storage test for testing the leakage resistance, none of the alkaline batteries using the gaskets of examples 47 to 49 experienced the electrolyte leakage.

TABLE 12

|  | Ex. 47 | Ex. 48 | Ex. 49 | Ex. 50 | Ex. 51 | Ex. 52 |
|---|---|---|---|---|---|---|
| Amount of kaoline added (%) | 5 | 10 | 15 | 5 | 10 | 15 |
| Outer diameter of injection portion [L] (mm) |  | 1.45 |  |  | 1.80 |  |
| Inner diameter of boss portion [$R_1$] (mm) |  |  | 1.10 |  |  |  |
| Outer diameter of boss portion [$R_2$] (mm) |  |  | 4.00 |  |  |  |
| Cross-sectional area of boss portion [$S_1$] (mm$^2$) |  |  | 11.62 |  |  |  |
| Cross-sectional area of injection portion [$S_2$] (mm$^2$) |  | 0.70 |  |  | 1.59 |  |
| $S_1/S_2$ |  | 16.57 |  |  | 7.29 |  |
| Weld line generated in boss portion | 0/50 | 0/50 | 0/50 | 18/50 | 23/50 | 35/50 |
| Sink mark generated in rim portion | 0/50 | 0/50 | 0/50 | 0/50 | 0/50 | 0/50 |
| Weld line generated in rim portion | 0/50 | 0/50 | 0/50 | 0/50 | 0/50 | 0/50 |
| Leakage (60° C., 90%, 1 M) | 0/20 | 0/20 | 0/20 | 0/20 | 0/20 | 0/20 |
| Leakage (60° C., 90%, 2 M) | 0/20 | 0/20 | 0/20 | 0/20 | 0/20 | 0/20 |
| Leakage (60° C., 90%, 3 M) | 0/20 | 0/20 | 0/20 | 0/20 | 0/20 | 0/20 |
| Leakage (45° C., 3 M) | 0/110 | 0/110 | 0/110 | 0/110 | 1/110 | 2/110 |
| Crack generated near gate (45° C., 3 M) | 0/10 | 0/10 | 0/10 | 3/10 | 5/10 | 7/10 |
| Leakage (45° C., 6 M) | 0/100 | 0/100 | 0/100 | 5/100 | 18/100 | 23/100 |
| Crack generated near gate (45° C., 6 M) | 2/10 | 3/10 | 6/10 | 10/10 | 10/10 | 10/10 |

The weld line was found in the boss portion 20 by the visual check in some of the gaskets (examples 50 to 52) having the $S_1/S_2$ value of 7.29, and being added with 5, 10, and 15 wt % of kaoline. In the storage test (45° C., 3 M, 6 M) for testing the leakage resistance, some of the alkaline batteries using the gaskets of examples 50 to 52 experienced the electrolyte leakage, and the crack was found in the gasket near the gate 12 in the alkaline batteries that experienced the electrolyte leakage.

The above-described results indicate that setting the $S_1/S_2$ value in the range of 10 to 25 makes it possible to prevent electrolyte leakage from the alkaline batteries using the gaskets added with 5 to 15 wt % of the inorganic filler during prolonged storage.

The inorganic filler may be calcium carbonate, carbon black, mica, or a blend of them.

The present invention has been described by way of the above-described preferred embodiments. However, such description of the embodiments should not be construed as limiting, and thus, various modifications can be made thereto. For example, although the above-described embodiments have been described using AA alkaline batteries as an example, similar advantages may be obtained for alkaline batteries of other sizes.

What is claimed is:

1. A battery gasket for sealing an opening of a battery case of a cylindrical alkaline battery, the battery gasket comprising:
   an injection-molded resin integral with a cylindrical boss portion having a through hole in which a current collector is inserted,
   a rim portion for sealing the opening of the battery case, and
   a connecting portion for connecting the boss portion and the rim portion, wherein
   the boss portion has an annular injection portion at an end face thereof, which is a trace of an injection molding gate,
   a ratio ($S_1/S_2$) between an axial cross-sectional area ($S_1$) of the boss portion and an axial cross-sectional area ($S_2$) of the injection portion is in the range of 10 to 25, and
   an outer diameter of the boss portion is in the range of 3.0 to 4.2 mm.

2. The battery gasket of claim 1, wherein
   the outer diameter of the boss portion is in the range of 3.0 to 3.4 mm.

3. The battery gasket of claim 1, wherein
   the resin forming the gasket contains 5 to 40 wt % of a recycled resin which has been removed from the injection-molded resin.

4. The battery gasket of claim 1, wherein
   5 to 15 wt % of an inorganic filler is added to the resin forming the gasket.

5. The battery gasket of claim 4, wherein
   the inorganic filler is talc or kaoline.

6. The battery gasket of claim 1, wherein
   the gasket is formed by injecting a resin into an injection mold through a gate arranged in the injection mold to correspond to an inner perimeter of the end face of the boss portion.

7. An alkaline battery, an opening of a battery case of which is sealed with the battery gasket of claim 1, wherein
   the injection portion at the end face of the boss portion of the gasket faces a battery component contained in the battery case.

8. The alkaline battery of claim 7, wherein
   the alkaline battery is an AA alkaline battery or an AAA alkaline battery.

* * * * *